Dec. 11, 1934.　　　　E. E. EATON　　　　1,984,259
HELICAL GEAR GRINDING MACHINE
Filed Sept. 14, 1933　　2 Sheets-Sheet 1
Fig. 1.
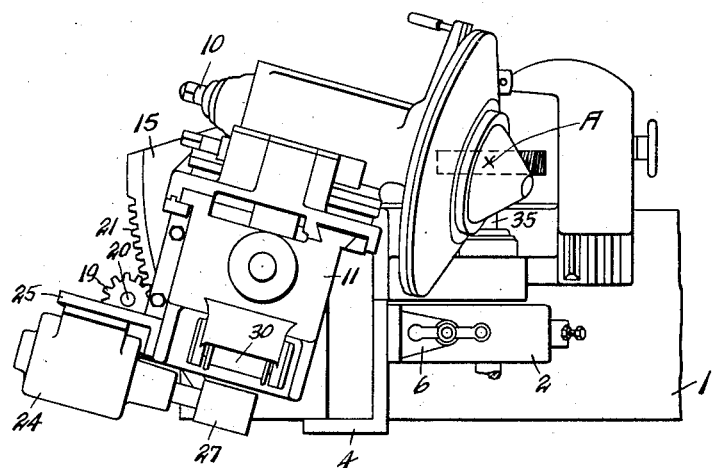
Fig. 2.
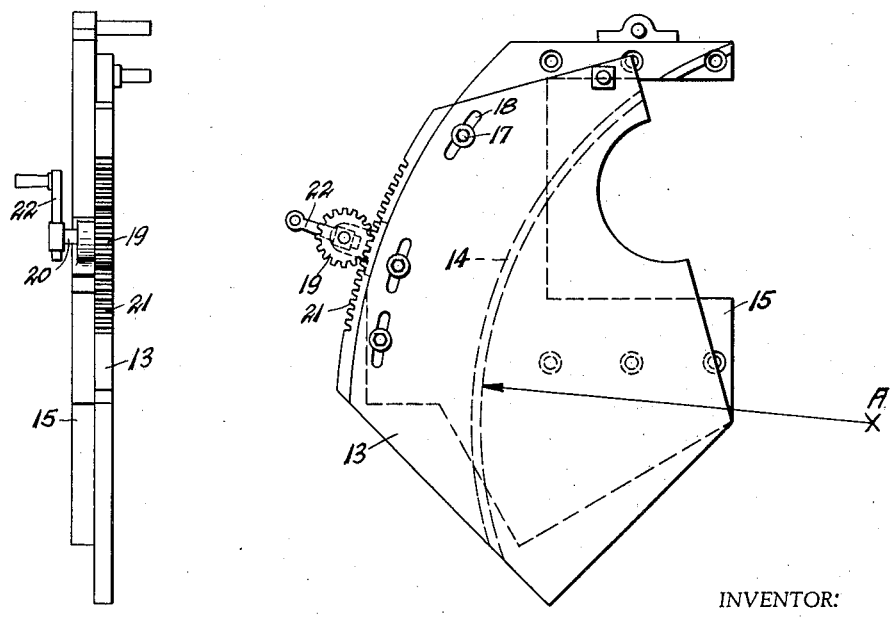
Fig. 3.
INVENTOR:
*Ernest E. Eaton,*
BY *Bodell & Thompson*
ATTORNEYS.

Patented Dec. 11, 1934

1,984,259

UNITED STATES PATENT OFFICE 1,984,259

HELICAL GEAR GRINDING MACHINE

Ernest E. Eaton, Toledo, Ohio, assignor to Spicer Manufacturing Corporation, Toledo, Ohio, a corporation of Virginia Application September 14, 1933, Serial No. 689,445

1 Claim. (Cl. 51—123)

This invention relates to gear grinding machines, and has for its object, an adjustment of the grinding wheel relative to the work spindle for the gear being ground, and to gear rolling and indexing mechanisms whereby the machine can be adjusted to grind helical gears, or gears with inclined teeth, as well as spur gears.

It further has for its object, a particularly simple and economical machine for grinding helical gears which is adjustable to helical gear teeth of different angles, and which eliminates the complications and expense of helical gear grinding machines now or heretofore used.

It further has for its object, a particularly simple mechanism for adjusting the grinding wheel support about an axis at an angle to the axis of the work spindle to vary the angle of the grinding wheel to conform to the angle of the helical gear teeth to be ground.

It further has for its object, a particularly simple mechanism for adjusting the grinding wheel support about an axis at an angle to the work spindle and intersecting the point or area of engagement of the grinding wheel with the tooth being ground.

Other objects appear throughout the specification.

The invention consists in the novel features and in the combinations and constructions hereinafter set forth and claimed.

In describing this invention, reference is had to the accompanying drawings in which like characters designate corresponding parts in all the views.

Figure 1 is a plan view of a gear grinding machine embodying my invention.

Figures 2 and 3 are respectively plan, and edge views of the adjusting mechanism for the pillar, or gear grinding wheel support.

Figure 4:
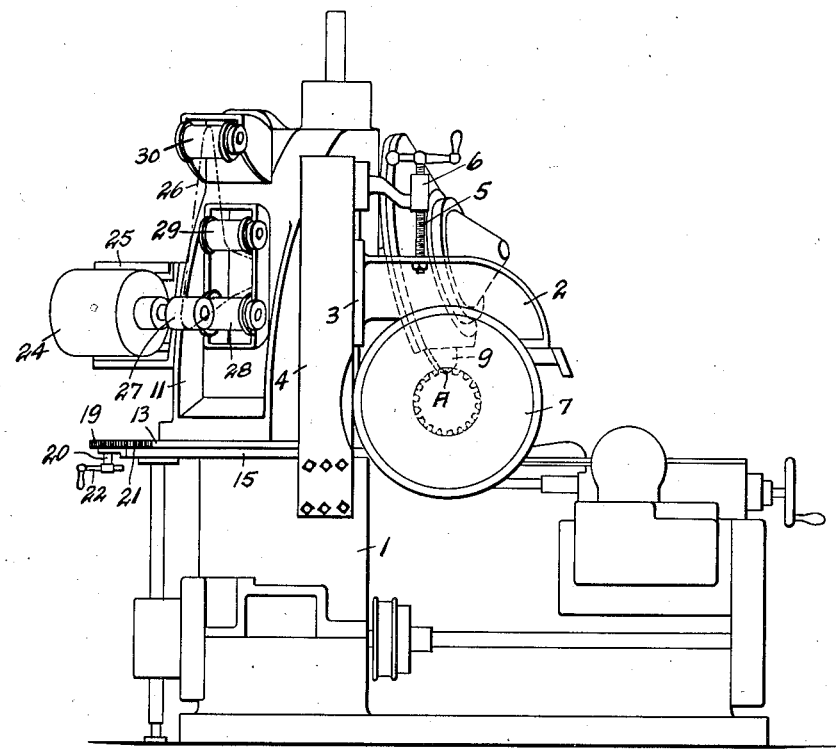
Figure 4 is an elevation of this machine.

I have here shown my invention as applied to a spur gear grinding machine of the general type shown in the patent of E. J. Lees No. 1,390,145, issued September 6, 1921, or to a gear grinding machine known commercially as Lees-Bradner Spur Gear Grinding Machine No. 10, now obsolete. A machine of the general type of the Lees patent was used for grinding spur gears and a special complicated and expensive machine used for grinding helical gears.

The object of this invention is a machine of the simplicity and comparative economy of the spur gear grinding machine for grinding helical gears.

A gear grinding machine of the type shown in the Lees Patent No. 1,390,145, comprises generally, a suitable base on which is mounted a work spindle, gear rolling and indexing mechanisms, a column or pillar fixedly mounted, without adjustment, on the base, supporting the grinding wheel in a fixed position relative to the base (except for a tilting movement in a vertical plane and a rectilinear vertical adjustment) and the mechanism mounted thereon, and suitable means for driving the grinding wheel and other mechanisms.

My helical gear grinding machine comprises a suitable frame, the usual work spindle, gear rolling and indexing mechanisms mounted on the frame, a grinding wheel and a spindle therefor, a support for the grinding wheel spindle mounted on the frame to hold the spindle and the grinding wheel in engagement with a tooth of the gear on the spindle being operated on, and also the mounting of the grinding wheel support so that it can be adjusted to carry the grinding wheel about an axis at an angle to the work spindle to vary the angle of the grinding wheel to conform to the angle of the helical tooth being ground, and also means for quickly effecting such adjustment.

It further includes actuating mechanism for the grinding wheel spindle carried as a unit with the grinding wheel support so as to partake of the adjusting movement thereof, and remain in juxtaposition to the grinding wheel, or grinding wheel spindle, during such adjustment.

In the type of gear grinding machine shown in the Lees patent referred to, a portion of the gear rolling mechanism is carried by the gear grinding wheel support or column. This portion is usually referred to as the tape arm. In my helical gear grinding machine, the tape arm is supported from the base of the machine so that the grinding wheel support or column is entirely independent of the work spindle, the gear rolling mechanism and the indexing mechanism.

Aside from the supporting of the index and gear rolling mechanisms, and other mechanism entirely independent of the grinding wheel support, the indexing and the gear rolling mechanisms, and the work spindle, may be of any suitable form, size and construction, as for instance, of the general type shown in said Lees patent.

The frame of the machine includes the usual base 1, on which is mounted, in any suitable manner, the work spindle, gear rolling and indexing mechanisms with the exception that the tape arm 2 is supported by a carriage 3 movable along a frame member 4, directly from the base instead of from the column or pillar supporting the grinding wheel mechanism. The tape arm is raised and lowered to adjust the tape in accordance with the pitch circle of the gear being ground, by means of a manually operated screw 5 threading through a bracket 6 carried by the frame member 4.

7 designates, generally, the index mechanism. The gear rolling mechanism includes the tape arm and may be of any suitable form, size and construction, and for a full description of one form thereof, reference is had to said Lees Patent No. 1,390,145.

9 designates the grinding wheel and 10 the spindle on which it is mounted.

The support for the grinding wheel, or its spindle, comprises a column or pillar 11 mounted on the base and adjustable about an upright axis, or at an axis extending in a general direction at a right angle to the axis of the work spindle 35 and preferably, the axis about which the gear grinding wheel, or its support, is adjustable, intersects the point or area A of engagement of the rim of the gear grinding wheel with the tooth of the gear being ground. It will be understood that in commercial helical gears, such as are used in motor vehicles, transmission gears etc., the helical teeth are of such small curvature that they are practically straight, and further that the grinding wheel is of such diameter that it engages the tooth from end to end without a lateral feeding of the wheel, or an axial shifting of the gear being ground.

In the illustrated embodiment of my invention, the column or pillar 11 is provided with a base plate 13 on the lower end thereof formed with an arcuate guide or ways movable along guides or complemental ways, as 14, formed in a plate 15 which is secured to the top face of the base 1, the center of the arcuate guide or the path of adjusting movement of the plate 13 being located at A in the point or area of the tooth being ground with which the grinding face of the grinding wheel is engaged. The plate 13 and consequently the column 11 are normally held from movement by suitable clamping means, as bolts 17, extending through slots 18 in the plate 13 and threading into the plate 15. The plate 13 and hence the column 11 is moved about its axis to vary the angle of the grinding wheel 9 by suitable mechanism including a pinion 19 mounted on a shaft 20 journalled in the plate 15 or a bracket thereon and meshing with an arcuate rack 21 on the plate 13, the shaft 20 of the pinion having a suitable handle 22. Thus, by loosening the bolts 17, the column 11 can be turned by means of the handle 22 to adjust the grinding wheel 9 to the angle of the teeth of the helical gear being ground.

The grinding wheel is actuated by driving mechanism which is carried by the adjustable column 11 and which shifts as a unit therewith. This mechanism, as here shown, includes an electric motor 24 mounted on a suitable bracket 25, which in turn is mounted upon the column 11 and a belt indicated by the line 26 running over pulleys 27 and 28 and then over a pulley, not shown, on the spindle of the grinding wheel, then over pulleys 29 and 30, back over the pulley 27. The pulley and belt arrangement forms no part of this invention.

The adjustments of the grinding wheel vertically form no part of this invention, and one form of means is shown in the Lees patent referred to. During the vertical adjustment, the belt indicated by the line 26 twists to conform to the angular or tilting adjustment.

By reason of the plates 13 and 15, the standard spur gear grinding machine can be readily adapted to grind helical gears by mounting the column or pillar on the plate 13 and securing the plate 15 to the base 1 and also by mounting the arm 2 on a frame member 4.

In operation, by turning the pinion 19 after the bolts 17 have been loosened, the entire column 11 is turned to adjust the angle of the grinding wheel to the angle of the teeth of the helical gear to be ground.

What I claim is:

In a gear grinding machine, the combination with a base, work supporting, gear rolling and indexing mechanism mounted on the base, a column, a grinding wheel and a spindle therefor mounted in the column, and means for actuating the spindle carried by the column as a unit therewith; of plates interposed between the column and the base and attachable to the column and base respectively, said plates having inter-engaging arcuate guide means and the upper plate supporting the column being movble about an axis along the arcuate guide means, whereby upon movement of the upper plate along the guide means, the column is shifted about an upright axis carrying the grinding wheel and actuating mechanism therewith, and means self-contained with said plates for shifting the upper plate and column about its axis relatively to the lower plate and the base, and for holding the upper plate in its adjusted position.

ERNEST E. EATON.